Sept. 12, 1939.　　　　C. W. MOTT　　　　2,172,986
POWER LIFT MECHANISM
Filed May 25, 1937　　　　2 Sheets-Sheet 1

Inventor
Carl W. Mott
By [signature]
Atty.

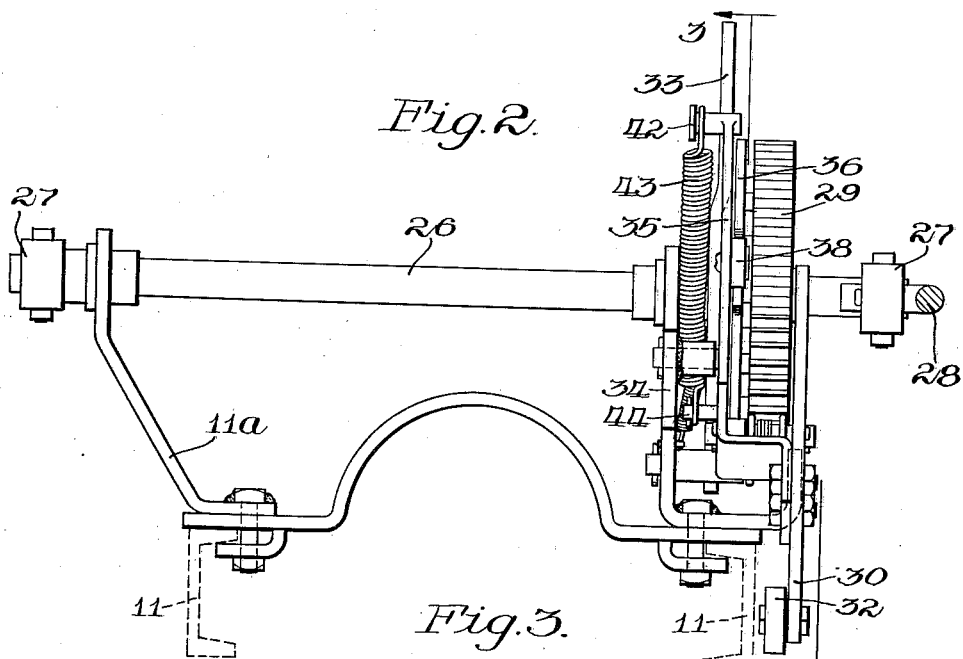

Patented Sept. 12, 1939

2,172,986

UNITED STATES PATENT OFFICE 2,172,986

POWER LIFT MECHANISM

Carl W. Mott, Rock Falls, Ill., assignor to International Harvester Company, a corporation of New Jersey Application May 25, 1937, Serial No. 144,672

20 Claims. (Cl. 97—50)

This invention relates to a power lift mechanism for a tractor.

The principal object of the invention is to provide a simplified power lift mechanism adapted to be mounted on a tractor having an implement attached thereto.

An important object of the invention is to provide a power lift mechanism including step-by-step rotation means driven by the tractor.

Another important object is to provide means for automatically disengaging the lift mechanism from the source of power on the tractor.

Another important object is to provide manual means for engaging and disengaging the lift mechanism.

Another object is to provide a compact power lift mechanism adapted to be mounted on the tractor in a manner that will not interfere with the operation of the tractor and its utilization with other implements.

Specifically, another object is to operate the lift mechanism from a power take-off shaft of the tractor and yet permit the power take-off shaft to be otherwise utilized without the detachment and reinstallation of numerous parts.

Still another object is to provide means on the power take-off shaft for oscillating power lift actuating means to impart step-by-step rotation to the lift mechanism.

Another object is generally to arrange the component parts of the lift mechanism in a manner permitting positive and efficient operation thereof.

Briefly, these and other important objects are achieved by providing on a tractor of the type best disclosed in assignee's patent to E. A. Johnston, 1,982,436, November 27, 1934, a power lift mechanism incorporating step-by-step or pawl and ratchet means driven from a power take-off shaft of the tractor. In the present instance, the power take-off shaft, or source of power, driven by the tractor is the usual pulley shaft with the pulley removed therefrom; although it is not necessary to remove the pulley from the shaft in the event the shaft will accommodate both the pulley and the means for oscillating the arm. Means are provided on the shaft to oscillate an arm carrying means adapted to engage a ratchet wheel for imparting step-by-step rotation thereto. The power take-off mechanism is operably connected by a lifting link to lifting and lowering mechanism carried on the tractor, which is connected to an agricultural implement pivotally attached to the tractor. Means are provided in the power lift mechanism for automatically disengaging the power lift mechanism from the driven shaft when the agricultural implement is lifted or lowered to its highest or lowest position. This means is controlled by a predetermined angular movement of the power lift mechanism. A manual means is also provided for engaging and disengaging the power lift mechanism for raising and lowering the implement.

A further understanding of the objects and desirable features of the invention may be had from the following description taken in connection with the accompanying sheets of drawings, in which:

Figure 2 is an enlarged sectional view taken substantially on the line 2—2 of Figure 1;

Figure 3 is a side elevational view partly in section as viewed along the line 3—3 of Figure 2; and, Figure 4 is a partial plan view with a portion thereof in section showing the pulley shaft extending from the transmission of the tractor.

Figure 1:
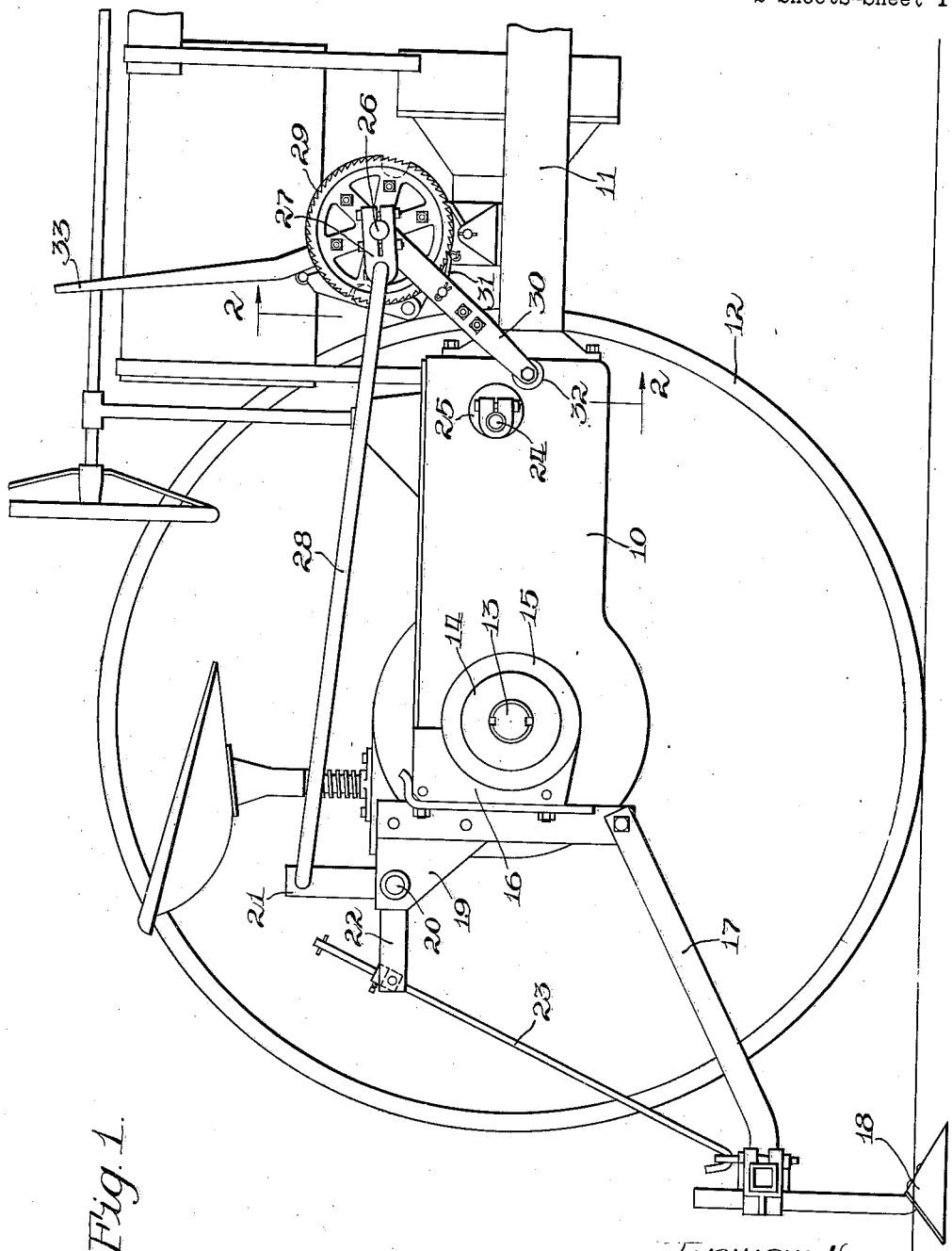
Figure 1 is a side elevational view of a tractor of the type hereinbefore referred to, the tractor being shown with its near wheel removed to show more clearly the power lift mechanism and the means for lifting and lowering the implement attached to the tractor.

The tractor shown in the drawings is best disclosed in assignee's above referred to patent to E. A. Johnston, and comprises generally a rear body portion 10 and a pair of side frame members or sills 11 extending forwardly therefrom. The tractor is supported on a pair of drive wheels 12, only one of which is shown, carried on a pair of drive axles 13, only one of which is shown. Axle housings 14 enclose the drive axles 13 and have cast integral therewith attaching flanges 15. Only one side of the tractor and the parts now to be described are shown, but it will be understood that similar parts are located on the opposite side of the tractor.

An attaching structure 16 is carried on each attaching flange 15 and has pivotally connected to the lower end thereof, a beam 17 of an agricultural implement. As shown in Figure 1, the agricultural implement, herein disclosed, is a cultivator comprising the beams 17 and cultivator shovels 18. At the upper ends of the attaching structures 16 are rigidly carried rearwardly extending bracket plates 19, in which is journaled a transverse rockshaft 20. The transverse rockshaft 20 comprises part of a lifting and lowering means carried by the tractor and including a bell crank comprising arms 21 and 22 rigidly carried by the rockshaft 20, the arm 22 being connected by a lifting link 23 to the rearward end of the beam. It will be understood that the agricultural implement and the lifting and lowering means carried by the tractor are only generally shown and described herein for the purpose of the disclosure.

At the forward portion of the body 10, which houses the tractor transmission, not shown, is a driven shaft 24. This shaft 24 extends transversely beyond the body 10, as best shown in Figure 4, and is a part of a transmission shaft. The transmission of the tractor and the location and purposes of this shaft are disclosed in assignee's patent, hereinbefore referred to.

In the present invention, the usual pulley is removed from the shaft 24 and means is provided, such as the eccentric drive member 25, for driving a power lift mechanism supported on the sills 11 of the tractor. The eccentric member 25 is keyed on the shaft 24. As previously mentioned, however, the pulley may be allowed to remain on the shaft 24, if provision is made for accommodation of both the pulley and the eccentric member 25. The power lift mechanism includes a transverse power lift shaft 26 journaled in a supporting structure 11a rigidly secured to the sills 11. The power lift shaft rigidly carries at each end, a lifting crank 27 which may be connected to the lifting and lowering mechanism hereinbefore described. In the present instance, only one crank 27 is connected by a link 28 to the arm 21 of the bell crank on the rockshaft 20.

The power lift mechanism further includes step-by-step rotation means, which, in the present disclosure, is in the form of a pawl and ratchet mechanism comprising a ratchet wheel 29 rigidly carried on the lift shaft 26 and a member or arm 30 movably carried on the shaft 26. The arm 30 carries a pawl 31 cooperating with the ratchet wheel 29 and extends downwardly and rearwardly within close proximity to the driven shaft 24. The arm 30 carries at its free end a roller 32, which cooperates with the eccentric member 25 on the driven shaft 24. In this manner, the arm 30 is adapted to be oscillated by the eccentric member 25, thus imparting step-by-step rotation to the power lift mechanism through the ratchet wheel 29 and the pawl 31.

Since it is not desirable to have the roller 32 in constant engagement with the eccentric member 25, means is provided for holding the arm 30 and the roller 32 in disengaged position. This means is associated with the power lift support structure 11a and includes a manually operable lever 33 movably carried on the lift shaft 26. At one side, the support structure 11a is provided with a rearwardly extending portion 34, to which is pivotally attached a member 35 which cooperates with the lever 33.

A plate 36 is disposed concentrically of the shaft 26 and is carried for rotation therewith and with the ratchet wheel 29. The plate 36 is provided with diametrically opposed notches 37 and 37a in the periphery thereof. A roller 38 carried by the member 35 is adapted to engage either of these notches, as will be hereinafter described. At its outer end, the supporting structure 11a is provided with an upwardly extending portion 39 in which is pivoted a retarding pawl 40 for the purpose of preventing reverse rotation of the ratchet wheel 29, as best shown in Figures 1 and 3. In its normal position, the lever 33 abuts the pivot pin carrying this pawl 40 and is resiliently held thereagainst by a spring 41. At the same time, the member 35 is resiliently held in a position with the roller 38 thereon engaging the notch 37 in the plate 36, the member 35 being provided at its upper end with a transversely extending cylindrical portion 42 abutting the rearward edge of the lever 33. A spring 43 is connected at one end to the portion 42 and at the other end to a forwardly and downwardly extending ear 44 rigidly carried on the arm 30. The arm 35, at a point substantially intermediate its pivotal connection with the bracket portion 34 and the roller 38, is provided with a transversely abutting portion 45, which, in the normal position of the member 35, abuts the upper edge of the arm 30 and holds the arm forwardly and downwardly.

From the above description, it will be apparent that the spring 43 provides means for holding the member 35 forwardly against the lever 33 and with the roller 38 thereon in engagement with the notch 37 in the plate 36. In this position of the member 35, the abutting portion 45 thereon is resiliently held against the arm 30, thus preventing engagement thereof with the eccentric member 25 in the driven member 24. It is an important feature of the invention that the spring 43 is connected substantially at the points shown in Figure 3; namely, at the outer end of the member 35 at 42 and at the ear 44 on the arm 30. It will be noted, in the stationary positions of the parts as shown in full lines in Figure 3, that the spring 43 is remote from the pivot of the member 35 and thus applies tension thereto when needed. When the lift mechanism is operated and the positions of the component parts thereof are changed, the spring 43 is moved farther from the lift shaft 26, thus applying more tension to the arm 30 for maintaining its engagement with the cam 25. In short, the spring 43 is provided in a manner that insures proper tension on certain parts when most needed.

In this manner, rotation of the shaft 24 and the eccentric member 25 is permitted without engaging the roller 32 on the arm 30.

In the operation of the power lift mechanism to raise the implement, the lever 33 is moved rearwardly by the tractor operator; is held momentarily, and then released. Rearward movement of the lever moves the member 35 rearwardly, disengaging the roller 38 thereon from the notch 37 from the plate 36, as shown in dotted lines in Figure 3. Rearward movement of the member 35, of course, moves the abutting portion 45 away from the arm 30, and the arm 30 is drawn upwardly and rearwardly by the spring 43 in a manner permitting engagement between the eccentric member 25 and the roller 32, also shown in dotted lines in Figure 3.

Rotation of the shaft 24 and the member 25 oscillates the arm 30, and the pawl 31 engages the teeth in the ratchet wheel 29 imparting step-by-step rotation thereto and to the power lift mechanism. Reverse rotation of the ratchet wheel is prevented by the pawl 40. The plate 36, being mounted for rotation with the ratchet wheel 29, is thus moved angularly in the direction of the arrow in Figure 3, and an unbroken portion of the periphery thereof moves into the path of the roller 38 on the member 35. In this manner, the member 35 is held rearwardly so that the abutting portion 45 thereon can not abut the upper edge of the arm 30. While the member 35 is thus positioned, the tension on the spring 43 is increased and holds the arm 30 upwardly and rearwardly, permitting constant engagement between the roller 32 thereon and the eccentric member 25.

Angular movement of the ratchet wheel 29 rotates the lift shaft 26 and operates the lifting and lowering mechanism to raise the agricultural implement at the rear of the tractor. Continued angular movement of the ratchet wheel 29 and the plate 36 brings the opposite notch 37a therein into position to receive the roller 38 on the member 35. When this occurs, the roller 38 moves into the notch 37a, being resiliently urged in that direction by the spring 43, and because of the leverage provided, the cylindrical abutting portion 45 on the arm 35 engages the upper edge of the arm 30 and moves it downwardly and forwardly, thus disengaging the roller 32 from the eccentric member 25. The power lift mechanism is thereby automatically disengaged from the driven shaft 24 of the tractor, the automatic means being provided by the cooperation between the member 35 and the arm 30, as caused by the diametrically opposed notches 37 and 37a in the plate 36.

To lower the implement, the lever 33 is moved rearwardly, held momentarily and released; the arm 30 is then permitted to move toward the eccentric member 25 and the lift mechanism is driven until the roller 38 on the arm engages the notch 37 in the plate 36.

From the foregoing description, it will be seen that the power lift mechanism comprises, briefly, step-by-step rotation means adapted to be driven by an arm oscillated by means on a shaft driven by the tractor. Means are provided for resiliently urging the oscillated means toward engagement with the driving means on the driven shaft. Manually operated means cooperating with the resilient means are provided for permitting the aforesaid driving engagement. Also, means are provided for automatically interrupting said driving engagement.

It will be understood, of course, that numerous modifications and alterations may be made in the above described construction without departing from the spirit and scope of the invention, as indicated in the following claims.

What is claimed is:

1. In a tractor having an agricultural implement attached thereto and including lifting and lowering linkage connected to the implement, the combination therewith, of a shaft extending from and driven by the tractor; an eccentric member secured to said shaft; power lift mechanism carried by the tractor, said mechanism including a support carried by the tractor, a shaft journaled in the support, a ratchet wheel secured to said shaft, an arm journaled on said shaft and extending within close proximity to the eccentric member on the driven shaft, a pawl carried on the arm and engaging the ratchet wheel, a crank carried on the lift shaft; a connection between said crank and the lifting and lowering linkage, and means for moving the aforesaid arm on the lift shaft into and out of engagement with the eccentric member on the driven shaft for intermittently rotating the ratchet wheel to raise and lower the aforesaid implement.

2. In a tractor having an agricultural implement attached thereto and including lifting and lowering linkage connected to the implement, the combination therewith, of a shaft driven by the tractor, an eccentric member driven by said driven shaft, power lift mechanism carried by the tractor and including a lift shaft and a ratchet wheel secured thereto, a crank arm secured to the lift shaft and operably connected to the aforesaid lifting and lowering linkage, means associated with the power lift mechanism and adapted to be engaged and oscillated by the eccentric member, said means including a pawl engaging the ratchet wheel, and means for moving the aforesaid means into and out of engagement with the eccentric member for intermittently rotating the ratchet wheel to lift and lower the aforesaid implement.

3. In a tractor having an agricultural implement attached thereto and including lifting and lowering linkage connected to the implement, the combination therewith, of a shaft driven by the tractor, and power lift mechanism carried by the tractor and operably connected to the lifting and lowering linkage, said lift mechanism including pawl and ratchet mechanism adapted to be actuated by the aforesaid driven shaft for raising and lowering the aforesaid implement.

4. In a tractor having an agricultural implement attached thereto and including lifting and lowering linkage connected to the implement, the combination therewith, of a shaft driven by the tractor, power lift mechanism carried by the tractor and operably connected to the lifting and lowering linkage, said lift mechanism including a lift shaft and pawl and ratchet mechanism carried thereby, means driven by the aforesaid driven shaft and adapted to actuate the pawl and ratchet mechanism, and means for engaging and disengaging the pawl and ratchet mechanism and the first means to operate the power lift mechanism for raising and lowering the aforesaid implement.

5. In a tractor having an agricultural implement attached thereto and including lifting linkage connected to the implement, the combination therewith, of a shaft driven by the tractor, and power lift mechanism carried by the tractor and operably connected to the lifting linkage, said power lift mechanism including step-by-step rotation means adapted to be actuated by the driven shaft in step-by-step movement for raising the aforesaid implement.

6. In a tractor having an agricultural implement attached thereto and including lifting and lowering linkage connected to the implement, the combination therewith, of a shaft driven by the tractor, means driven by said shaft, and power lift mechanism carried by the tractor and operably connected to the lifting and lowering linkage, said power lift mechanism including pawl and ratchet step-by-step rotation means and a member associated therewith adapted to be oscillated by the first means and the driven shaft for actuating the power lift mechanism to raise and lower the aforesaid implement.

7. In a tractor having an agricultural implement attached thereto and including lifting and lowering linkage connected to the implement, the combination therewith, of a shaft driven by the tractor, an eccentric member driven by said driven shaft, power lift mechanism carried by the tractor and including a lift shaft and a ratchet wheel secured thereto, a crank arm secured to the lift shaft and operably connected to the aforesaid lifting and lowering linkage, means associated with the power lift mechanism and adapted to be engaged and oscillated by the eccentric member, said means including a pawl engaging the ratchet wheel, means for moving the aforesaid means into and out of engagement with the eccentric member for intermittently rotating the ratchet wheel to lift and lower the aforesaid implement, and means for automatically moving said first named means out of engagement with the eccentric member after a predetermined movement of the power lift mechanism.

8. In a tractor having an agricultural implement attached thereto and including lifting and lowering linkage connected to the implement, the combination therewith, of a shaft driven by the tractor, power lift mechanism carried by the tractor and operably connected to the lifting and lowering linkage, said lift mechanism including a lift shaft and pawl and ratchet mechanism carried thereby, means driven by the aforesaid driven shaft and adapted to actuate the pawl and ratchet mechanism, means for engaging and disengaging the pawl and ratchet mechanism and the first means to operate the power lift mechanism for raising and lowering the aforesaid implement, and means for automatically disengaging the pawl and ratchet mechanism and the first means after a predetermined movement of the power lift mechanism.

9. In a tractor having an agricultural implement attached thereto and including lifting and lowering linkage connected to the implement, the combination therewith, of a shaft driven by the tractor, means adapted to be driven by said shaft, and power lift mechanism carried by the tractor and operably connected to the lifting and lowering linkage, said power lift mechanism including pawl and ratchet step-by-step rotation means and a member associated therewith adapted to be oscillated by the first means and the driven shaft for actuating the power lift mechanism to raise and lower the aforesaid implement, and means for automatically interrupting oscillation of the aforesaid member after a predetermined movement of the power lift mechanism.

10. In a tractor having an agricultural implement attached thereto and including lifting and lowering linkage connected to the implement, the combination therewith, of a shaft driven by the tractor, and power lift mechanism carried by the tractor and operably connected to the lifting and lowering linkage, said lift mechanism including pawl and ratchet mechanism adapted to be actuated by the aforesaid driven shaft for raising and lowering the aforesaid implement, and means associated with the lift mechanism for automatically rendering said mechanism inoperative after a predetermined angular movement thereof.

11. In a tractor having an agricultural implement attached thereto and including lifting and lowering linkage connected to the implement, the combination therewith, of a shaft driven by the tractor, and power lift mechanism carried by the tractor and operably connected to the lifting and lowering linkage, said power lift mechanism including step-by-step rotation means adapted to be actuated by the driven shaft to give step-by-step movement to the linkage for raising the aforesaid implement and to give step-by-step movement to the linkage for lowering the aforesaid implement, and means associated with the lift mechanism for automatically rendering said mechanism inoperative after a predetermined angular movement thereof.

12. In a tractor having an agricultural implement attached thereto and including lifting and lowering linkage connected to the implement, combination therewith, of a shaft driven by the tractor, and power lift mechanism carried by the tractor and operably connected to the lifting and lowering linkage, said lift mechanism including pawl and ratchet mechanism, drive means associated with the driven shaft and the lift mechanism, resilient means for urging said drive means into position to establish driving relation between the driven shaft and the pawl and ratchet mechanism, and control means for holding the drive means out of the aforesaid driving relation, said control means being operable to permit said driving relation to actuate the pawl and ratchet mechanism for raising and lowering the aforesaid implement.

13. In a tractor having an agricultural implement attached thereto and including lifting and lowering linkage connected to the implement, the combination therewith, of a shaft driven by the tractor, and power lift mechanism carried by the tractor and operably connected to the lifting and lowering linkage, said lift mechanism including pawl and ratchet mechanism, drive means associated with the driven shaft and the lift mechanism, resilient means for urging said drive means into position to establish driving relation between the driven shaft and the pawl and ratchet mechanism, control means for holding the drive means out of the aforesaid driving relation to actuate the pawl and ratchet mechanism for raising and lowering the aforesaid implement, and means for automatically interrupting said driving relation after a predetermined angular movement of the lift mechanism.

14. In a tractor having an agricultural implement attached thereto and including lifting and lowering linkage connected to the implement, the combination therewith, of a shaft driven by the tractor, and power lift mechanism carried by the tractor and operably connected to the lifting and lowering linkage, said lift mechanism including step-by-step rotation mechanism, drive means associated with the driven shaft and the lift mechanism, resilient means for urging said drive means into position to establish driving relation between the driven shaft and the step-by-step rotation mechanism, and control means for holding the drive means out of the aforesaid driving relation, said control means being operable to permit said driving relation to actuate the step-by-step rotation mechanism for raising and lowering the aforesaid implement.

15. In a tractor having an agricultural implement attached thereto and including lifting and lowering linkage connected to the implement, the combination therewith, of a shaft driven by the tractor, and power lift mechanism carried by the tractor and operably connected to the lifting and lowering linkage, said lift mechanism including step-by-step rotation mechanism, drive means associated with the driven shaft and the lift mechanism, resilient means for urging said drive means into position to establish driving relation between the driven shaft and the step-by-step rotation mechanism, control means for holding the drive means out of the aforesaid driving relation to actuate the step-by-step rotation mechanism for raising and lowering the aforesaid implement, and means for automatically interrupting said driving relation after a predetermined angular movement of the lift mechanism.

16. In a tractor having an agricultural implement attached thereto and including lifting and lowering linkage connected to the implement, the combination therewith, of a shaft disposed transversely of and driven by the tractor, power lift mechanism carried by the tractor and operably connected to the lifting and lowering linkage, said lift mechanism including a transversely disposed lift shaft and pawl and ratchet mechanism carried thereby, means driven by the aforesaid driven shaft and adapted to actuate the pawl and ratchet mechanism, and means for engaging and disengaging the pawl and ratchet mechanism and the first means to operate the power lift mechanism for raising and lowering the aforesaid implement.

17. In a tractor having an agricultural implement attached thereto and including lifting and lowering linkage connected to the implement, the combination therewith, of a shaft disposed transversely of and driven by the tractor, an eccentric member driven by said driven shaft, power lift mechanism carried by the tractor and including a transversely disposed lift shaft and a ratchet wheel secured thereto, a crank arm secured to the lift shaft and operably connected to the aforesaid lifting and lowering linkage, means associated with the power lift mechanism and adapted to be engaged and oscillated by the eccentric member said means including a pawl engaging the ratchet wheel, and means for moving the aforesaid means into and out of engagement with the eccentric member for intermittently rotating the ratchet wheel to lift and lower the aforesaid implement.

18. In a tractor having an agricultural implement attached thereto and including lifting and lowering linkage connected to the implement, the combination therewith, of a shaft disposed transversely of and driven by the tractor, power lift mechanism carried by the tractor and operably connected to the lifting and lowering linkage, said lift mechanism including a transversely disposed lift shaft and pawl and ratchet mechanism carried thereby, means driven by the aforesaid driven shaft and adapted to actuate the pawl and ratchet mechanism, means for engaging and disengaging the pawl and ratchet mechanism and the first means to operate the power lift mechanism for raising and lowering the aforesaid implement, and means for automatically disengaging the pawl and ratchet mechanism and the first means after a predetermined movement of the power lift mechanism.

19. The combination with a tractor having a rotatable driven shaft and an implement adapted to move toward and away from the ground, of a lifting device comprising a first means mounted on the tractor for angular movement for moving the implement toward and away from the ground, and a second means actuated by the driven shaft for supplying in steps angular movement to the first means to move the implement toward the ground and for supplying in steps angular movement to the first means to move the implement away from the ground.

20. The combination with a tractor having a driven shaft and an implement adapted to move toward and away from the ground, of a lifting device comprising a lifting shaft mounted for rotation on the tractor, a first means fixed to the lifting shaft for rotation therewith for raising and lowering the implement, and a second means including a pawl and ratchet oscillated by the driven shaft for effecting rotation of the lift shaft and the first means.

CARL W. MOTT.